Sept. 19, 1950     C. A. LIKES ET AL     2,522,623
PORTABLE REFRIGERATOR

Filed Feb. 2, 1948     3 Sheets-Sheet 1

Carl A. Likes
Harry O. Kas
INVENTORS.

Sept. 19, 1950   C. A. LIKES ET AL   2,522,623
PORTABLE REFRIGERATOR
Filed Feb. 2, 1948   3 Sheets-Sheet 2
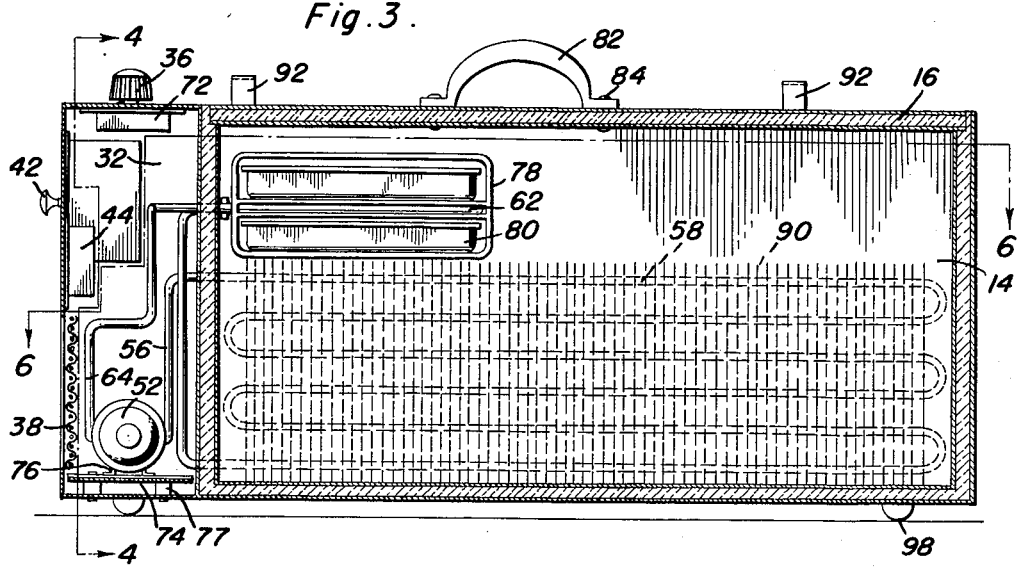
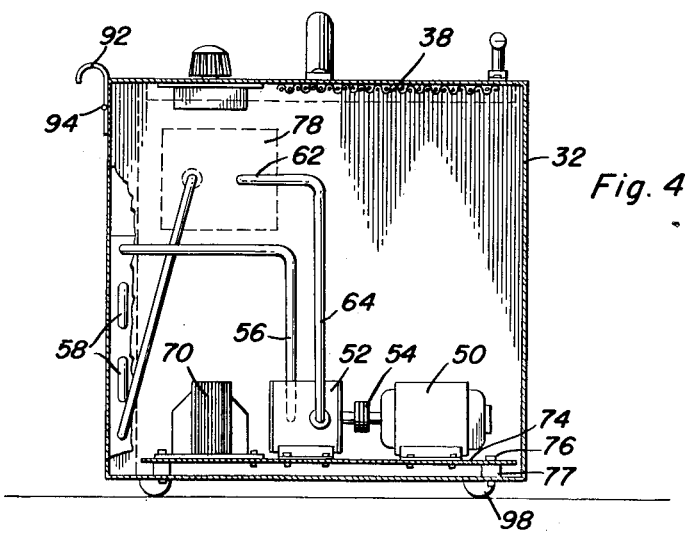
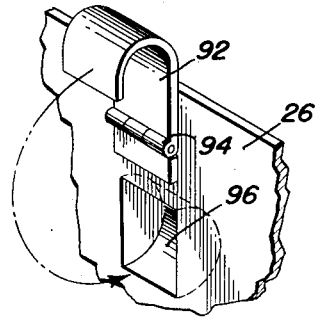
Carl A. Likes
Harry O. Kas
INVENTORS.

Sept. 19, 1950 C. A. LIKES ET AL 2,522,623
PORTABLE REFRIGERATOR
Filed Feb. 2, 1948 3 Sheets-Sheet 3
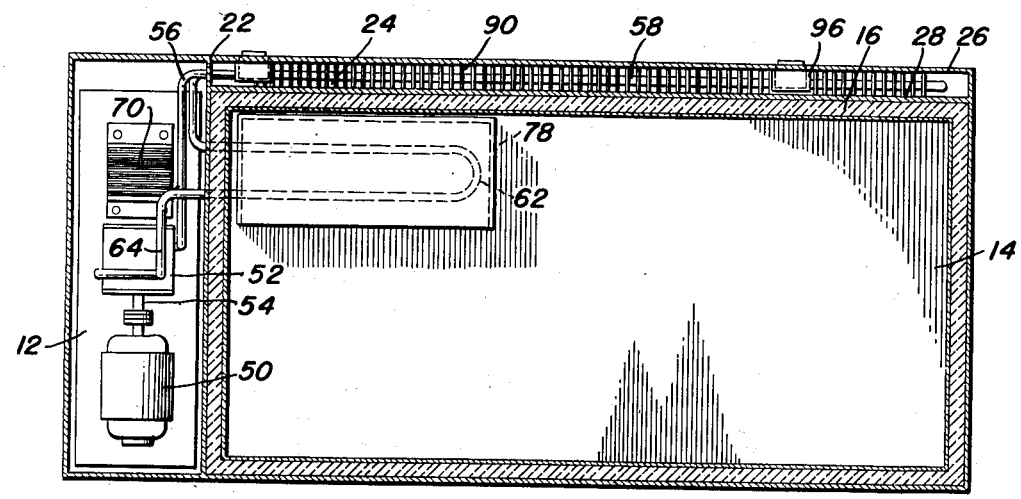
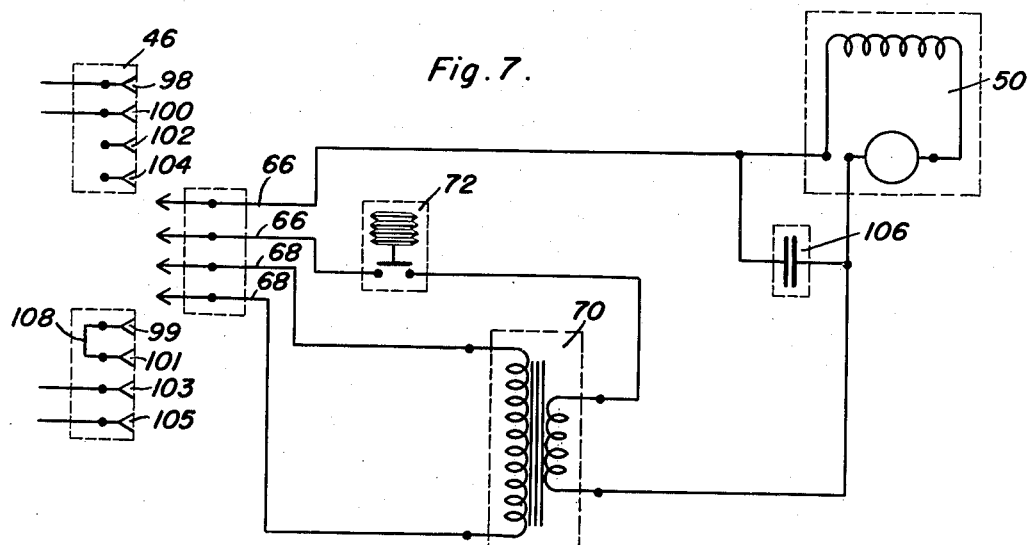
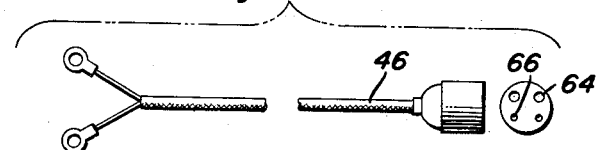
Carl A. Likes
Harry O. Kas
INVENTORS.
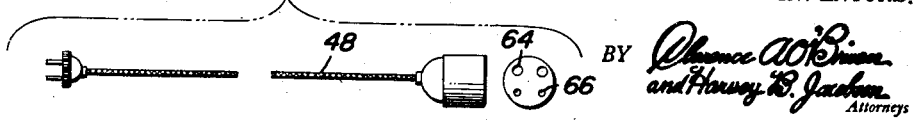
BY
Attorneys Patented Sept. 19, 1950

2,522,623

UNITED STATES PATENT OFFICE 2,522,623

PORTABLE REFRIGERATOR

Carl A. Likes and Harry O. Kas, Ellis, Kans.

Application February 2, 1948, Serial No. 5,738

3 Claims. (Cl. 62—4)

This invention relates to a portable electric refrigerator capable of being used in many types of conveyances, such as trucks, automobiles, ambulances and in the home as well as in both civil and military aircraft.

As may be known, it is often desirable to be able to have a small refrigerating system easily carried about. Such a device is of value to families out on pleasure trips, such as picnics, tours, or the like. It would also be useful to truck drivers when they haul freight on long runs and are not able to conveniently stop at hotels or auto courts. With such equipment, food and drinks are easily stored and kept wholesome for long periods of time. Another use for such a device would be to enable doctors and ambulances to keep serums, blood plasma, etc., under refrigeration while traveling to the point of use. In addition, such small compact refrigerating system would find great utility in places where space is limited, such as small apartments or trailers or perhaps in the armed forces.

A primary object of the invention therefore, is to provide a portable electric refrigerator which may be used in a vehicle or in the home, as may be desired.

A further object of the invention is to provide a portable refrigerator carrying case capable of keeping trays of ice in a frozen condition, or keeping other perishable articles in a proper state of preservation.

It is a further object of the invention to provide a compact and efficient refrigerating system of simple design and capable of being geared to mass production of manufacture.

A still further object of the invention is to eliminate radio interference when the unit is in operation.

And still another object of the invention is to provide attaching means for the unit which are recessed into the frame when the device is not in use.

The invention accordingly comprises the features of construction, combination of elements and arrangements of parts, which are exemplified in the description hereinafter in connection with the accompanying drawings, and the scope of the application of which will be indicated in the following claims.

In the accompanying drawings, on which is illustrated one of the various possible embodiments of the invention:

Figure 3 is a vertical section of the structure illustrated in Figure 1;

Figure 4 is a section viewed on line 4—4 of Figure 3;

Figure 5 is a perspective detail of the means to support the device in a vehicle;

Figure 6 is a horizontal view taken on line 6—6 of Figure 3;

Figure 7 is a diagram of the electric circuit;

Figure 8 shows the connection for a six volt plug;

Figure 9 shows the connection for a 110-volt plug.

Figure 1:
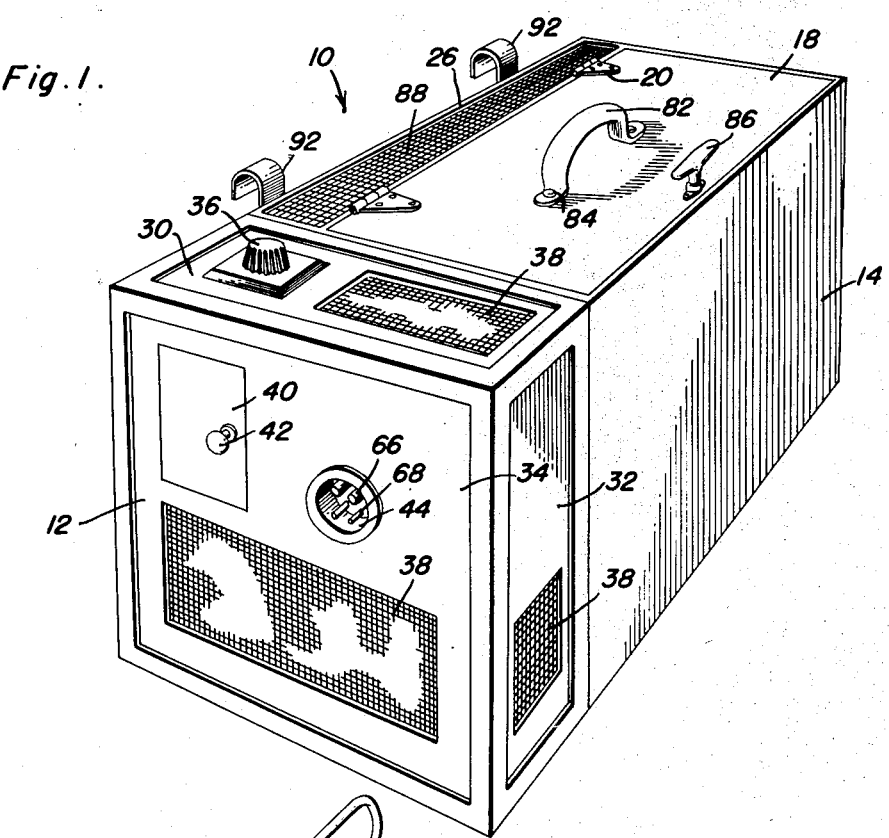
Figure 1 is a perspective view of the refrigerator of the invention.
Figure 2:
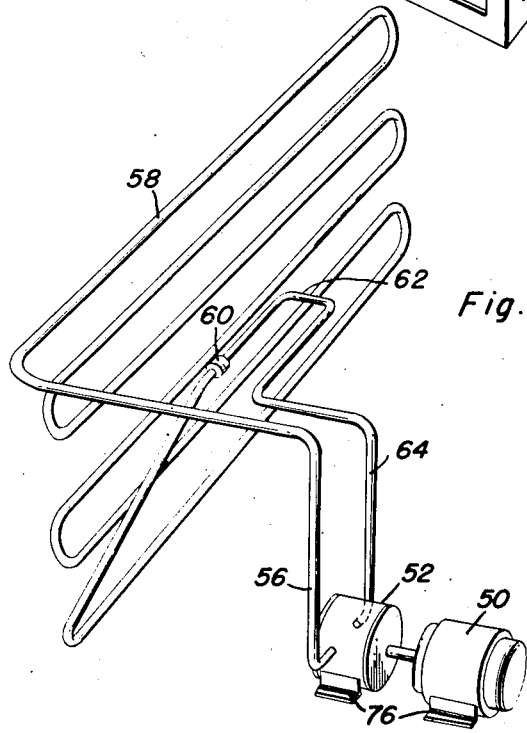
Figure 2 is a diagrammatic perspective view enlarged, of the refrigerator unit.

Referring to the figures, the device of the invention comprises a portable box-shaped carrying case 10 and includes a refrigerating section 12 and a storage section 14 separated by suitable insulation 16. A cover 18, hinged at 20, provides the means for access to the cold storage compartment 14.

The refrigerator control section 12 is separated from storage 14 and insulation 16 by means of a wall 22. Wall 22 also serves to separate condenser unit 24 enclosed within a housing 26, which is, in turn, separated from cold storage 14 by a wall 28. As is best seen in Figure 1, section 12 includes top 30, sides 32 and panel 34. Knob 36 is mounted on 30 and controls the temperature of the refrigerating unit, as will shortly be explained. Ventilating means such as a grill 38, for air circulation, are supplied to all sides of the housing 12. A door 40, leading to a storage space and provided with knob 42 for opening, is mounted on panel 34. A recess 44 on panel 34 serves to receive the plug end of a 6-volt connection 46 or a 110-volt connection 48, as is best illustrated in Figures 8 and 9.

Referring to Figures 2, 3, 4 and 6, the refrigerator control means consists of a series wound motor 50, an open unit compressor 52 connected by any desired type of flexible coupling 54. The compressor unit is of any suitable type to be found on the open market and is a sealed-in unit and contains refrigerant and oil in proper quantities. The connecting lines are preferably of copper tubing and consist of tube 56 leading from compressor 52 to coil 58 on condenser unit 24, a suitable refrigerant metering device 60, freezing coil 62 and tube 64 leading back to compressor 52, in the refrigeration cycle usual to most mechanical refrigerating machines.

Terminals 66, 68 of a jack lead to a transformer 70 in housing 12 and are connected in series to a thermostat 72, controlled by knob 36 for automatic temperature regulation. The refrigerating unit is mounted on a plate 74 on the floor of compartment 12 and is securely fastened thereto at 76 by any selected means and includes shock mounts 77 to absorb vibration and minimize noise. A freeze compartment 78 includes coils 62 and ice cube trays 80 and is mounted in storage compartment 14, in order to provide ice cubes, if desired, or a small frozen food locker.

A handle 82 is riveted at 84 to cover 18 to facilitate carrying of the device. Latching means 86 is included to secure cover 18. A grill 88 (see Figure 1) similar to grill 38 is provided for condenser unit 24. Condenser coils 58 include the usual fins 90.

J-shaped brackets 92 hinged at 94 and secured to housing 26 as by welding, enable the device 10 to be hung on the rail behind the front seat of the vehicle, or on any suitable projection, and pivots into recess 96 when not in use, to eliminate any projecting parts. A number of rubber pads or feet 98 are fastened to the bottom of the device to prevent marring of the table or shelf on which the refrigerator may be placed.

Referring to the electrical wiring diagram illustrated in Figure 7, the operation of the unit is readily apparent. When in use on a vehicle, a 6-volt D. C. plug 46 containing contacts 98, 100, 102 and 104 is plugged into socket 44. The circuit is completed only as to terminal 66 and the system is energized. Current travels to thermostat 72, the secondary of transformer 70, electric motor 50 and out. A condenser 106 is in parallel, as is usual. When in use at home, a 110-volt A. C. plug 48 containing contacts 99, 101, 103 and 105 is plugged into socket 44. The circuit at terminal 108 remains closed. The circuit is closed at 103, 105 and current travels through the primary of the transformer 70. The voltage is then stepped down to six volts by the secondary of the transformer and then the current travels through the closed circuit including condenser 106, motor 50, thermostat 72, terminals 66 and terminal 108.

From the above, it will be seen that the several objects of the invention are attained and other advantageous results achieved.

As many modifications of the embodiment above illustrated might be made without departing from the spirit or scope of the invention, and it is intended that the above description and accompanying drawings and claims shall be interpreted as illustrative and not in a limiting sense.

Having described the invention, what is claimed as new is:

1. A portable refrigerator comprising a substantially rectangular housing, a substantially rectangular insulating wall within said container forming a storage compartment, one longitudinal side of said wall being spaced from the corresponding side of said housing to form a condenser compartment and one transverse side of said wall being spaced from the corresponding side of said housing to form a refrigerating compartment, a motor and compressor operatively connected thereto mounted in said refrigerating compartment, condenser coils connected to said compressor and extending into said condenser compartment, an ice cube tray in said storage compartment, an evaporator extending into said storage compartment and surrounding said ice cube tray, and plug means carried by said housing and operatively connected to said motor adapted to engage a socket of an electrical supply and energize said motor.

2. The combination of claim 1 including supporting brackets hingedly mounted on said housing, and means to receive said brackets when not in use.

3. The combination of claim 1 including a cover pivotally mounted on said housing, handle means carried by said cover, and means to lock said cover in a closed position.

CARL A. LIKES.
HARRY O. KAS.

REFERENCES CITED

The following references are of record in the file of this patent:

UNITED STATES PATENTS

| Number | Name | Date |
|---|---|---|
| 1,561,820 | Bedford | Nov. 17, 1925 |
| 1,902,954 | Hockfeld | Mar. 28, 1933 |
| 1,926,767 | Furniss | Sept. 12, 1933 |
| 1,932,696 | Heydthausen | Oct. 31, 1933 |
| 1,935,307 | Ackerman | Nov. 14, 1933 |
| 1,938,141 | Goldkind | Dec. 5, 1933 |
| 2,029,175 | Limpert | Jan. 28, 1936 |
| 2,281,404 | Wurster | Apr. 28, 1942 |
| 2,392,727 | Dailey | Jan. 8, 1946 |